United States Patent [19]

Tanaka et al.

[11] 4,279,950

[45] Jul. 21, 1981

[54] JOINTING OF CONCRETE STRUCTURE

[75] Inventors: Hiromichi Tanaka, Chiba; Choji Tomizawa, Funabashi, both of Japan

[73] Assignee: Sumitomo Chemical Company, Limited, Osaka, Japan

[21] Appl. No.: 105,990

[22] Filed: Dec. 21, 1979

[30] Foreign Application Priority Data

Dec. 26, 1978 [JP] Japan ................... 53-161711

[51] Int. Cl.³ .................... B05D 3/00; B05D 7/00
[52] U.S. Cl. ................... 427/393.6; 427/140; 427/403; 427/407.1; 428/63; 428/451
[58] Field of Search .............. 427/393.6, 403, 407, 427/140; 428/63, 451

[56] References Cited

U.S. PATENT DOCUMENTS

| 2,422,665 | 6/1947 | Fredrickson et al. | 428/451 |
| 2,760,885 | 8/1956 | Larsen | 428/451 |
| 3,196,122 | 7/1965 | Evans | 428/451 X |
| 3,546,007 | 12/1970 | Douglas | 428/451 |
| 3,592,724 | 7/1971 | King et al. | 428/451 X |

FOREIGN PATENT DOCUMENTS

| 48-13927 | 5/1973 | Japan | 427/393.6 |
| 49-31529 | 8/1974 | Japan | 427/393.6 |
| 825457 | 12/1959 | United Kingdom | 427/403 |

*Primary Examiner*—Shrive P. Beck
*Attorney, Agent, or Firm*—Birch, Stewart, Kolasch & Birch

[57] ABSTRACT

A jointing of concrete structure comprising applying an adhesive to a base concrete structure and applying a new concrete thereto, which is characteristic in that the adhesive comprises a vinyl acetate-ethylene copolymer emulsion having a glass transition temperature of $-5°$ to $+5°$ C., said adhesive being the vinyl acetate-ethylene copolymer emulsion per se, or a cement paste or cement mortar which contains the vinyl acetate-ethylene copolymer emulsion. The jointing of the present invention can give a strong joint force between the old concrete structure and the new concrete.

10 Claims, No Drawings

JOINTING OF CONCRETE STRUCTURE

The present invention relates to a method of jointing concrete structures. More particularly, it relates to a method of jointing concrete structures using a specific vinyl acetate-ethylene copolymer emulsion (hereinafter, referred to as "VAE emulsion") as an adhesive.

Sometimes, concrete structures such as concrete walls are attempted to reinforce by jointing new concrete to base concrete structures (hereinafter, referred to as "old concrete structures"). However, the jointing is occasionally insufficient because of the inferior adhesion which exists between the old concrete and the new concrete, particularly when the old concrete has been exposed to wind and rain for a long period of time and hence has a deteriorated surface.

It has recently been proposed to apply adhesives onto the concrete surface and to finish the surface with a cement mortar. According to this method, the finishing is carried out in a very thin layer in comparison with the thickness of the base concrete, and hence, it has no effect in reinforcing the old concrete structures, and even if the layer of the finishing shrinks by drying, the stress is so small and does not give any unfavorable effect on the finishing mortar even in less adhesion. However, it has never been tried to joint a new concrete of a large thickness such as 10 cm or more to an old concrete structures by this method.

The jointing of concrete structures is usually carried out by various methods, such as by tipping the surface of the old concrete structures to make it rough and then applying the new concrete with a high density of the reinforcing steel, by using an epoxy resin adhesive without making the surface of the old concrete structures rough, or by welding the reinforcing steel in the old structure with the reinforcing steel to be newly jointed. By tipping the surface of the old concrete structures, the adhesion between the old concrete and the new concrete is physically increased. However, this method requires much labor and time and is still insufficient in adhesion, and hence, it is still necessary to increase the density of the reinforcing steel for the new concrete, which results in a high cost. According to the method of using an epoxy resin adhesive, it is very difficult to select the most suitable adhesive among the commercially available epoxy resin adhesives, and further, since the commercially available epoxy resin adhesives are usually two-part systems, they must be mixed immediately before use thereof and must be applied within the pot life thereof, and further, the new concrete must also be applied within the pot life of the adhesive, and hence, this method has unfavorably severe time restriction. Besides, the commercially available epoxy resin adhesives contain usually some amine compounds as a curing agent, which causes unfavorably side effects such as allergic inflammation on the skin of persons handling the adhesives. Moreover, although the method of welding the reinforcing steels can give sufficient jointing, the reinforcing steel in the old structure must partially be exposed in order to weld with the new reinforcing steel, which requires much labor. Besides, the welding requires fire, and hence, this method can not be employed for the reinforcing of an oil-fencing bank wherein a tank containing flammable substances is provided. If required by all means, the flammable substances must be moved to other place and the tank can not be employed during the operation. The method of tipping the surface of the old concrete structures has also a similar problem.

As a result of intensive study of the present inventors, it has been found that the jointing of concrete structures can favorably be achieved by using a specific VAE emulsion as an adhesive.

An object of the present invention is to provide an jointing method of concrete structures having a strong joint force. Another object of the invention is to provide an improved jointing of an old concrete with a new concrete by using a specific adhesive. These and other objects and advantages of the invention will be apparent to persons skilled in the art from the following description.

The jointing of the old concrete with the new concrete by the present invention is carried out by using a VAE emulsion having a glass transition temperature (Tg) of $-5°$ to $+5°$ C. as an adhesive.

The VAE emulsion is used as it is or in the form of a composition of the VAE emulsion and a cement and/or mortar.

According to the present invention, the jointing of the old concrete and the new concrete may be done in the following manners.

(1) A VAE emulsion is firstly applied to the old concrete as an adhesive and then the new concrete is applied thereto.

(2) A cement paste containing a VAE emulsion (hereinafter, referred to as "polymer-modified cement paste") is applied to the old concrete as an adhesive and then the new concrete is applied thereto.

(3) A cement mortar containing a VAE emulsion (hereinafter, referred to as "polymer-modified cement mortar") is applied to the old concrete as an adhesive and then the new concrete is applied thereto.

(4) A VAE emulsion is firstly applied to the old concrete as a primer and a cement paste or cement mortar containing a VAE emulsion is applied onto the emulsion layer as an adhesive, and then the new concrete is applied thereto.

The VAE emulsion used in the present invention can be obtained by a conventional emulsion polymerization of vinyl acetate and ethylene, and has a Tg of $-5°$ to $+5°$ C. The VAE emulsion includes also a product obtained by emulsion polymerization of vinyl acetate, ethylene and a vinyl monomer having at least one functional group such as a carboxyl, epoxy, hydroxy, sulfonic acid, methylol, alkoxy group as the third component, subject to satisfying the condition of Tg of $-5°$ to $+5°$ C. Said third component is contained in the copolymer in an amount of 5% by weight or less based on the total weight of the copolymer. The amount of ethylene component in the VAE emulsion may vary within the range of 10 to 30% by weight based on the total weight of the copolymer, so that the glass transition temperature becomes within the range of $-5°$ to $+5°$ C. A conventional emulsifier including a suspending agent can be used for the emulsion polymerization. Preferred example of emulsifier is a partially saponified polyvinyl alcohol.

When the glass transition temperature of the VAE emulsion is lower than $-5°$ C., the polymer is inferior in the cohesive force and adhesion, and the polymer shows a very low adhesion, particularly when it is applied at a high temperature. On the other hand, when the glass transition temperature is higher than $+5°$ C., the VAE emulsion has a larger content of vinyl acetate and hence has an inferior resistance against alkaline substances contained in concrete.

When only the VAE emulsion is applied as an adhesive as it is, it is preferably used in an amount of 10 to 100 g/m$^2$, more preferably 30 to 100 g/m$^2$, particularly 30 to 50 g/m$^2$ (calculated as the polymer content). In this case, a plain cement paste or mortar may optionally be applied onto the emulsion layer before the new concrete is applied thereto. When the VAE emulsion is applied as a primer and thereafter the polymer-modified cement paste or the polymer-modified cement mortar composition is further applied, the VAE emulsion is preferably used in an amount of 10 to 50 g/m$^2$ (calculated as the copolymer).

The VAE emulsion has preferably a solid content, i.e. a content of the polymer, of about 10 to 20% by weight because of good workability.

When the VAE emulsion is used in the form of a cement paste, the polymer-modified cement paste contains preferably 2 to 20% by weight, more preferably 2 to 10% by weight, of the VAE emulsion (calculated as the polymer content) based on the weight of cement. Besides, when the VAE emulsion is used in the form of a cement mortar composition containing the VAE emulsion, the polymer-modified cement mortar composition contains cement and sand in the ratio of 1:1 to 1:3 by weight and contains preferably the VAE emulsion of 2 to 20% by weight (calculated as the polymer content) based on the weight of cement. When the composition contains less than 2% by weight of the VAE emulsion, it shows an inferior adhesion, and on the other hand, when the composition contains more than 20% by weight of the VAE emulsion, not only adhesion to the old concrete structures but also the cohesive force of the polymer-modified cement paste or polymer-modified cement mortar per se become inferior.

The polymer-modified cement mortar or polymer-modified cement paste is applied in an average thickness of about 1 to 5 mm. When the thickness of the coating layer of the polymer-modified cement mortar or polymer-modified cement paste is less than 1 mm, the coating is insufficient and the adhesion becomes occasionally inferior. On the other hand, when the thickness of the coating is more than 5 mm, the cost for coating becomes high, while the adhesion increases no more, but occasionally rather decreases.

The coating of the VAE emulsion, polymer-modified cement mortar or molymer-modified cement paste may be carried out by troweling, brushing, spray coating with a spray gun, or other conventional methods.

When only a VAE emulsion is applied or a VAE emulsion is applied as a primer, the new concrete or polymer-modified cement mortar or polymer-modified cement paste is generally applied within a period of less than 200 hours after the application of the VAE emulsion. Besides, when the polymer-modified cement mortar or polymer-modified cement paste is applied, the new concrete is preferably applied within a period of 1 to 14 days after the application of the polymer-modified cement mortar or polymer-modified cement paste.

The old concrete structures, to which the method of the present invention is applicable, include the concrete structures wherein the hydraulic reaction has been finished, and also the concrete structures wherein the hydraulic reaction is still processing.

The present invention is illustrated by the following Examples but is not limited thereto.

EXAMPLE 1

To an old concrete structure (10×10×20 cm) (4 or more weeks has lapsed after the application) was applied a VAE emulsion (Sumikaflex 400, a tradename of Sumitomo Chemical Co., Ltd., Tg: 0° C., solid content: 55% by weight, which was diluted with water 4-fold) as a primer by brushing in an amount of 25 g/m$^2$ (as the polymer) to the section of the concrete (10×10 cm). After air-drying for 24 hours, a polymer-modified cement mortar which contained the VAE polymer of 4% by weight (as the polymer content) base on the weight of cement, was applied onto the coating layer of the primer by troweling in a thickness of 2 mm, said polymer-modified cement mortar being prepared by mixing a cement (NS Bond Cement, a tradename of a cement mortar made by Nippon Kasei K.K., which is a mixture of portland cement and silica sand of 1:1 by weight) with a VAE emulsion (Sumikaflex 400 as mentioned above, which is diluted with water 3-fold) and kneading the mixture well. After allowing to stand for 7 days, a concrete comprising water (165 parts by weight), portland cement (330 parts by weight), fine aggregates (i.e. river sand, specific weight: 2.61, 723 parts by weight), and coarse aggregates (i.e. river gravel, maximum size of the aggregates: 25 mm, specific weight: 2.64, 1145 parts by weight) was applied with a frame to form a structure of 10×10×20 cm. After drying and curing at room temperature for 4 weeks, the concrete structure was subjected to a test of flexural strength in accordance with a method disclosed in JIS A-1106. The result is shown in Table 1.

REFERENCE EXAMPLE 1

Example 1 was repeated except that no primer of a VAE emulsion and no polymer-modified cement mortar were used. The resulting concrete structure was also subjected to the test of flexural strength likewise. The result is shown in Table 1.

EXAMPLE 2

Example 1 was repeated except that no primer was applied and the polymer-modified cement mortar was spray-coated with a spray gun in a thickness of 2 mm. The resulting concrete structure was also subjected to the test of flexural strength likewise. The result is shown in Table 1.

EXAMPLE 3

Example 1 was repeated except that instead of using the primer and the polymer-modified cement mortar, a polymer-modified cement paste, which contained the VAE polymer of 3% by weight (as the polymer content) based on the weight of cement, prepared by mixing portland cement with NS Hiflex #1000 (a tradename of mortar-adhesion reinforcement, made by Nippon Kasei K.K.), was applied by brushing in a thickness of 1 mm. The resulting concrete structure was subjected to the test of flexural strength likewise. The result is shown in Table 1.

EXAMPLE 4

In the same manner as described in Example 1, the same VAE emulsion as used in Example 1 was applied to the concrete as an adhesive in an amount of 40 g/m$^2$ (calculated as the polymer), and after air-drying for 24 hours, a concrete was applied thereto likewise. The concrete structure thus obtained was subjected to the test of flexural strength likewise. The result is shown in Table 1.

TABLE 1

| Example No. | Flexural strength (kg/cm$^2$) |
| --- | --- |
| Example 1 | 24.7 |
| Example 2 | 23.5 |
| Example 3 | 25.1 |
| Example 4 | 20.0 |
| Reference Example 1 | 11.5 |

EXAMPLE 5

An old concrete wall (thickness: 10 cm) which has elapsed for about 8 years was brushed, and to the surface was applied a polymer-modified cement mortar with a spray gun in a thickness of 2 mm, said polymer-modified cement mortar being prepared by mixing NS Bond Cement with Sumikaflex 400 (diluted with water 3-fold, in an amount of 10% by weight (calculated as the VAE polymer content) based on the weight of the cement) and kneading well the mixture. After 5 days, a concrete (raw concrete: 210 kg/cm$^2$, slump: 15 cm, measured by a test for compressive strength of concrete as described in JIS A-1108) was applied with a frame to form a concrete structure of 10 cm in a thickness of the new concrete part. After 4 weeks, the structure was cut in a size of 100×20×20 cm to give a test piece. The test piece was subjected to a test of flexural strength. As a result, it showed a flexural strength of 28.1 kg/cm$^2$, and it was confirmed that break was almost not observed at the interface of the jointing. When the old concrete wall and the new concrete (thickness: 10 cm) were each subjected to the test of flexural strength likewise, both showed a flexural strength of 28.4 kg/cm$^2$ and 36.2 kg/cm$^2$, respectively. When the flexural strength of the jointed concrete structure is compared with that of the old concrete structure and new concrete, it is clear that the jointing of the concretes was sufficiently done.

What is claimed is:

1. A method for jointing concrete structures comprising applying an adhesive to a base concrete structure and then applying new concrete thereto, said adhesive comprising an emulsion of a copolymer of ethylene and vinyl acetate, or a copolymer of ethylene, vinyl acetate and a vinyl monomer having a functional group selected from the group consisting of carboxyl, epoxy, hydroxy, methylol and alkoxy group, said copolymer emulsion having a glass transition temperature of $-5°$ to $+5°$ C.

2. The method for jointing concrete structures according to claim 1, wherein the emulsion alone is used as the adhesive.

3. The method for jointing concrete structures according to claim 1, wherein the adhesive is a cement paste which contains said emulsion in an amount of 2 to 20% by weight, calculated as the copolymer content, based on the weight of the cement.

4. The method for jointing concrete structures according to claim 3, wherein said emulsion is present in an amount of 2 to 10% by weight.

5. The method of jointing concrete structure according to claim 1, wherein the adhesive is a cement mortar composition which contains the emulsion in an amount of 2 to 20% by weight, calculated as the copolymer content, based on the weight of cement contained in the cement mortar.

6. The method for jointing concrete structures according to claim 1, wherein the emulsion is applied in an amount of 10 to 100 g/m$^2$, calculated as the copolymer content.

7. The method for jointing concrete structures according to claim 6, wherein the emulsion is applied in an amount of 30 to 100 g/m$^2$.

8. The method for jointing concrete structures according to claim 6, wherein the emulsion is applied in an amount of 30 to 50 g/m$^2$.

9. The method for jointing concrete structures according to claims 3 or 5, wherein the adhesive is applied in an average thickness of 1 to 5 mm.

10. The method for jointing concrete structures according to claims 3 or 5, wherein a primer consisting of a vinyl acetate-ethylene copolymer emulsion having a glass transition temperature of $-5°$ to $+5°$ C. is applied as a primer to the base concrete structure in an amount of 10 to 50 g/m$^2$, calculated as the copolymer content, and thereafter the adhesive is applied thereto.

* * * * *